United States Patent [19]

Howe

[11] 3,937,201

[45] Feb. 10, 1976

[54] CYLINDER FOR RECIPROCABLE PISTON INTERNAL COMBUSTION ENGINES

[75] Inventor: Hans-Ulrich Howe, Bensberg-Frankenforst, Germany

[73] Assignee: Klockner-Humboldt-Deutz AG, Cologne, Germany

[22] Filed: Nov. 2, 1973

[21] Appl. No.: 412,442

[30] Foreign Application Priority Data

Nov. 4, 1972 Germany ............................ 2254053

[52] U.S. Cl....... 123/193 CH; 29/156.4 WL; 92/171

[51] Int. Cl.²........................ F16J 11/04; F02F 1/08

[58] Field of Search.... 92/171; 123/193 CH, 193 C, 123/193 H, 41.83, 41.84; 29/156.4 WL

[56] References Cited

UNITED STATES PATENTS

| | | | |
|---|---|---|---|
| 1,606,787 | 11/1926 | Holmes | 123/193 CH |
| 2,444,963 | 7/1948 | Taylor | 123/193 CH |
| 2,492,582 | 12/1949 | Klotsch et al. | 123/193 CH |
| 2,939,753 | 6/1960 | Schilling et al. | 92/171 |
| 3,139,009 | 6/1964 | Härting | 123/193 CH |
| 3,166,053 | 1/1965 | Fischer et al. | 92/171 |
| 3,363,608 | 1/1968 | Scherenberg et al. | 123/193 CH |

FOREIGN PATENTS OR APPLICATIONS

| | | | |
|---|---|---|---|
| 668,899 | 8/1963 | Canada | 123/41.84 |
| 17,499 | 7/1912 | United Kingdom | 92/171 |

*Primary Examiner*—Wendell E. Burns
*Assistant Examiner*—Sheldon Richter
*Attorney, Agent, or Firm*—Walter Becker

[57] ABSTRACT

A cylinder for reciprocable internal combustion engines with a top section fixedly connected to the cylinder into which a cylinder bushing is inserted in dry condition. One end of the cylinder bushing extends with slight radial play into an annular flat groove provided in the top section of the cylinder and having its inner circumferential surface form an angle in excess of 70° with that portion of the top section which faces toward the interior of the cylinder.

1 Claim, 2 Drawing Figures

CYLINDER FOR RECIPROCABLE PISTON INTERNAL COMBUSTION ENGINES

The present invention relates to a cylinder for reciprocable piston internal combustion engines with a fixedly connected top plate and a cylinder bushing which has been inserted in dry condition and which has one end extending with play into an annular groove of said top plate.

For manufacturing reasons and for purposes of increasing the wear resistance, it is known to insert so-called cylinder liners or bushings of steel or cast iron into air or water-cooled cylinders. In order to assure a good heat conductivity, such cylinder liners or bushings, which as a rule have a lower heat conductivity than that of the cylinder, should be thin-walled and should closely engage the cylinder over as large a surface as possible in all regions of operation. Due to the different heat expansion of the cylinder liner and of the cylinder, small gaps will form between the same which gaps interfere with the heat flow. Furthermore, combustion gases enter these gaps and deposit residues thereby forming an insulating layer. These deposits also bring about that the cylinder, when the internal combustion engine cools off, exerts a relatively strong radial pressure upon the cylinder liner or bushing and thereby deforms the same inwardly. These facts, which occur over a longer period of time, eventually bring about a seizing of the piston in view of the narrowing of the cylinder liner or bushing.

A cylinder with a cylinder lining which has been inserted in dry condition is disclosed for instance in German Pat. No. 438,700 according to which the cylinder liner or bushing is slotted and resiliently engages the cylinder wall. Such slotted cylinder liners have, however, not proved satisfactory in practice.

A cylinder of the above mentioned type has also been disclosed in German Pat. No. 725,807. According to this design, the cylinder liner consists of cast iron and is by means of tie rods tightened to the crank housing. In order to be able to absorb the presently customary high forces, it would be necessary to design the cylinder liner or bushing with relatively thick walls whereby the heat flow would be affected in view of the low heat conductivity coefficient of the cylinder liner or bushing. With a thick-walled design and the inherent greater stiffness, the contact of the cylinder liner or bushing with the cylinder would be less which fact likewise reduces the heat transfer. Furthermore, the cylinder liner or bushing will have to be relatively deeply inserted into the top plate. Due to the deeper notch, the strength of the top plate which is particularly subjected to bending stresses would be reduced to an undesired extent. Finally, the top plate of the heretofore known cylinder has a cup-shaped or hemispherical contour so that the groove at its inner circumferential surface forms an acute edge with the top surface at the cylinder side which edge has the unfavorable effect that heat accumulates at this area.

It is, therefore, an object of the present invention with cylinders of the above mentioned type, to prevent undue deformation of a thin-walled cylinder liner or bushing without endangering the strength of the remaining structural elements.

These and other objects and advantages of the invention will appear more clearly from the following specification in connection with the accompanying drawings, in which.

Figure 1:
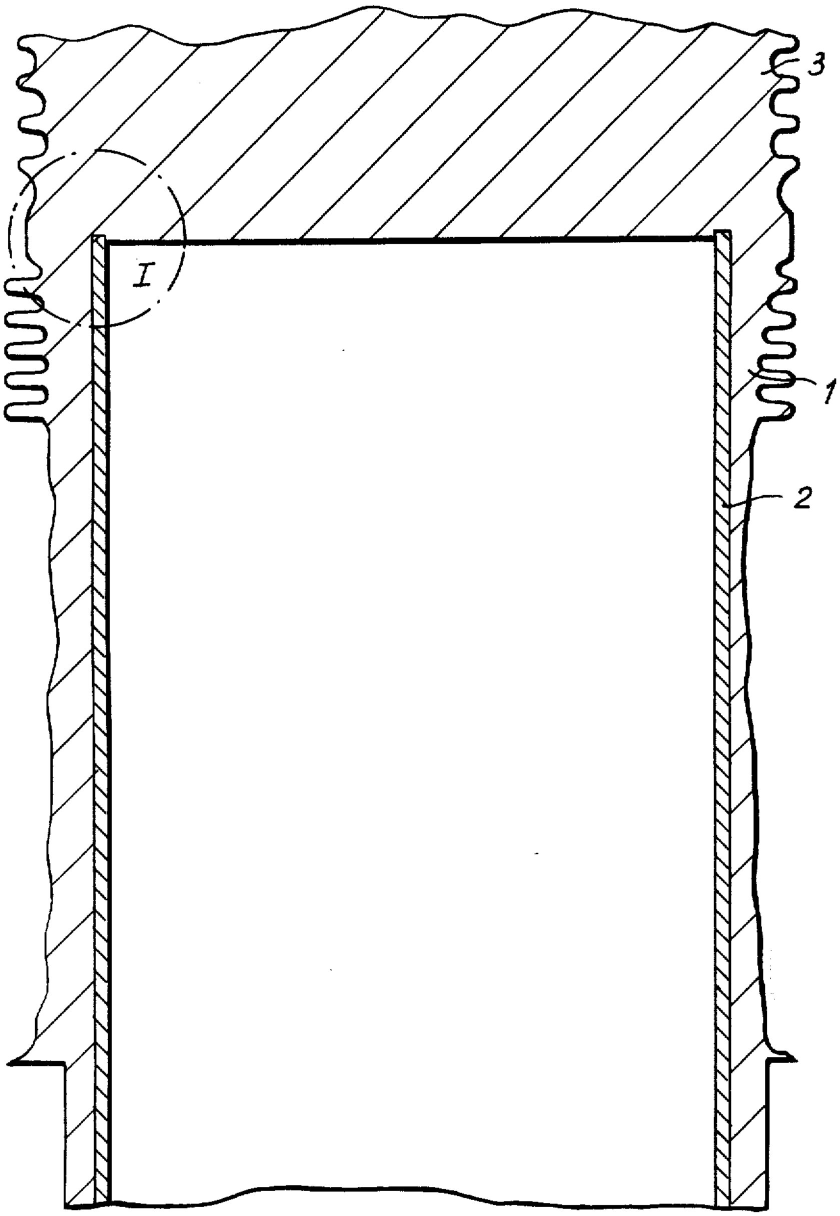
FIG. 1 shows a longitudinal section through a portion of a cylinder according to the present invention.

The cylinder for reciprocable piston internal combustion engines with fixedly connected top plate and cylinder bushing or liner inserted in dry condition, which bushing or liner has one end extend into an annular groove of the top plate with slight radial play, is according to the present invention characterized in that the groove is flat and that its inner circumferential surface forms with said top surface at the cylinder side an angle $\alpha$ in excess of 70°.

When the cylinder heats up, the top plate will expand to a greater extent than the cylinder liner or bushing so that the inner circumferential surface of the groove will engage the inner mantle surface of the cylinder bushing or liner and thereby will interrupt the passage of combustion gases into the chamber between the cylinder bushing or liner and the cylinder. Furthermore, the inner circumferential surface of the groove will prevent the cylinder bushing or liner from narrowing to an undue extent. Due to the flat design of the groove and the shaping of the edges, care is taken that within the region of the groove no heat accumulation nor stresses can occur which might lead otherwise to forming tears in the top plate.

According to a further development of the invention, it is suggested that the outer and inner fillet of the groove is rounded and that the corresponding edges of the cylinder liner or bushing are chamfered. In this way, the notch effect of the groove will be avoided and a snug engagement of the cylinder bushing or liner at the end face will be realized without affecting the radial engagement.

For purposes of improving the seal at the end face, it has proved advantageous to make the engaging surface of the cylinder bushing or liner approximately 1 millimeter wide while the space between the inner circumferential surface of the groove and the inner mantle surface of the cylinder bushing should amount to approximately 0.1 millimeter while the groove should have a depth of from 0.8 to 2 millimeters.

As a rule, the cylinder and the top plate form one single cast piece. For manufacturing reasons, it is sometimes desirable to make the cylinder and the top plate separately and subsequently to weld the same to each other. In such an instance, it is expedient according to a further development of the invention to connect the top plate to the cylinder by electron beam welding in which instance the cylinder bushing or liner has a portion thereof forming a part of the welding root. Cylinder and cylinder liner or bushing as well as the top plate may be finish-machined prior to the welding operation because no material distortion is caused by the electron beam welding. Furthermore, by connecting the cylinder bushing to the cylinder, no gap can form therebetween into which combustion gases could enter. With regard to a simple manufacturing process and an optimum seal, it is advantageous according to a further development of the invention to have the welding seam extend on the bottom of the groove.

Figure 2:
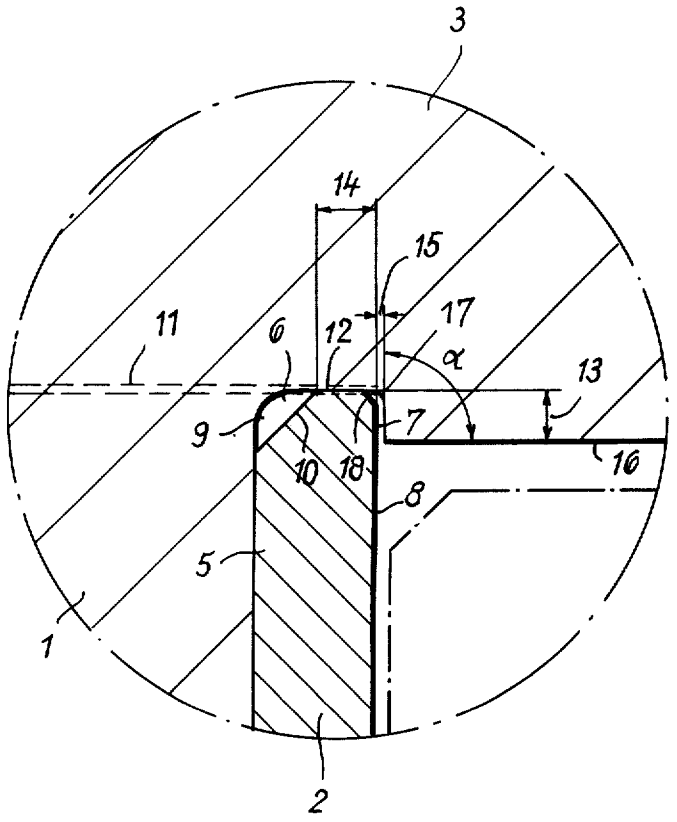
FIG. 2 illustrates on a larger scale than that of FIG. 1 that portion of FIG. 1 which is encircled by a dot-dash circle.

Referring now to the drawings in detail, the cylinder 1 with an assumed diameter of 100 millimeters has inserted therein a cylinder liner or bushing 2 with a wall thickness of approximately 2 millimeters which has its outer mantle surface snugly engage the cylinder 1. The cylinder bushing or liner 2 consists of wear-resistant material as for instance steel or cast iron. Cylinder 1 has fixedly connected thereto a top plate 3 which may form a portion of the cylinder head. This may be obtained by having the cylinder 1 and the top plate 3 form a single cast piece or by connecting the cylinder 1 and top plate 3 by welding to each other. The cylinder bushing or liner 2 has its end 5 extend into a flat annular groove 6 in the top plate 3. Between the inner circumferential surface 7 of the annular groove and the inner mantle surface 8 of the cylinder bushing 2 there is provided a slight play 15 which during the operation of the cylinder and piston will be bridged due to the different heat expansion between the top plate and the cylinder liner or bushing. If the cylinder 1 and the top plate 3 form a single integral cast piece, it is expedient to round the inner and outer fillet 9,17 of groove 6 as illustrated in FIG. 2. The corresponding edges 10 and 18 on the cylinder bushing or liner 2 are beveled or chamfered.

If the top plate 3 is welded to the cylinder 1 by an electron beam, it is expedient that the welding seam 11 is located at the level of the bottom 12 of the groove. In this instance, the rounding of the fillet 9 and the breaking of the edge 10 is not necessary so that the end face of the cylinder bushing or liner 2 will engage the groove bottom 12 over a greater width.

In FIG. 2, the groove depth is designated with the reference numeral 13 and the width of the engaging surface of the cylinder bushing or liner is designated with the reference numeral 14. The inner circumferential surface 7 of groove 6 forms an angle $\alpha$ of 90° with the top surface 16 at the cylinder side.

It is, of course, to be understood that the present invention is, by no means, limited to the specific showing in the drawings but also comprises any modifications within the scope of the appended claims.

What I claim is:

1. A thin wall cylinder for reciprocable piston internal combustion engines, which includes in combination: a top section fixedly connected to said cylinder and provided with a relatively flat annular groove open in the direction toward said cylinder, a cylinder bushing installed dry into said cylinder without seal and extending in substantially continuous contact with the wall of said cylinder and directly into said annular groove, the inner circumferential surface of said groove defining with that surface of said top section which faces toward the interior of said cylinder an angle in excess of 70° with said inner surface spaced from said bushing an amount less than the expansion of said top section in said bushing to close said gap, said top section being connected to said cylinder along a plane through the bottom of said groove along an electron beam weld seam which also includes the end of said bushing in said groove.

* * * * *